US012669771B2

(12) United States Patent
Itoh

(10) Patent No.: US 12,669,771 B2
(45) Date of Patent: Jun. 30, 2026

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Jun Itoh, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/968,160

(22) Filed: Dec. 4, 2024

(65) Prior Publication Data

US 2025/0189919 A1 Jun. 12, 2025

(30) Foreign Application Priority Data

Dec. 7, 2023 (JP) ................................ 2023-207174

(51) Int. Cl.
*G03G 15/00* (2006.01)

(52) U.S. Cl.
CPC ..... *G03G 15/5062* (2013.01); *G03G 15/6508* (2013.01); *G03G 15/6529* (2013.01); *G03G 2215/00383* (2013.01); *G03G 2215/00569* (2013.01)

(58) Field of Classification Search
CPC .......... G03G 15/5062; G03G 15/6508; G03G 15/5041; G03G 15/502
See application file for complete search history.

(56) References Cited

U.S. PATENT DOCUMENTS 8,917,412 B2 * 12/2014 Kakegawa ........... G06F 3/1244 358/1.15
2020/0166882 A1 * 5/2020 Yamashita ......... G03G 15/5062
2022/0050410 A1 * 2/2022 Hirose ............... G03G 15/5041
2022/0373955 A1 * 11/2022 Mutsuno ........... G03G 15/5062

FOREIGN PATENT DOCUMENTS

JP 2022110889 A 7/2022

* cited by examiner

*Primary Examiner* — Jessica L Eley
(74) *Attorney, Agent, or Firm* — ROSSI, KIMMS & McDOWELL LLP

(57) ABSTRACT

The image forming apparatus which comprises a plurality of sheet holding units each configured to hold a sheet and a printing unit configured to print an image, receives a print setting for a first type test chart image to be printed on sheets conveyed from all of the plurality of sheet holding units and for a second type test chart image to be printed on a sheet conveyed from at least one sheet holding unit of the plurality of sheet holding units, and controls the printing unit on a basis of the print setting to convey sheets from each of the plurality of sheet holding units and print the first type test chart image and following thereafter convey a sheet from the at least one sheet holding unit from among the plurality of sheet holding units and print the second type test chart image.

10 Claims, 11 Drawing Sheets

IMAGE FORMING APPARATUS, CONTROL METHOD FOR IMAGE FORMING APPARATUS, AND STORAGE MEDIUM

BACKGROUND OF THE INVENTION

Field of the Invention

The present invention relates to an image forming apparatus, a control method for an image forming apparatus, and a storage medium.

Description of the Related Art

An image forming apparatus can be used in various apparatuses such as a copy machine, a printer, a fax machine, and a multi-function peripheral including these.

A known printing apparatus (image processing apparatus) that forms images on sheets includes a function (hereinafter referred to as a “test chart print”) of confirming whether an operation of forming an image on a sheet is operating normally. Also, relating to a function of adjusting image formation on sheets, a test chart print is used as an operation for printing an image for adjustment on a sheet. Japanese Patent Laid-Open No. 2022-110889 describes a technology for performing adjustment for all designated sheet holding cassettes. With this technology, an operation of printing images for adjustment from all of the sheet holding cassettes is performed in order to perform adjustment.

An image for confirmation (hereinafter referred to as a “test chart image”) printed in a test chart print needs to be printed after a suitable test chart image is selected from the perspective of confirming the printing operation. Depending on the printing operation confirmation perspective, the test chart image may need to be printed on a sheet conveyed from all of the sheet holding cassettes installed in the image forming apparatus for confirmation. For example, in the case of a test chart image for confirming the position of an image formed on a sheet, the test chart image needs to be printed and confirmed for each sheet holding cassette. On the other hand, there also exists a test chart image that enables the printing operation to be confirmed by the test chart image being printed on a sheet from one of the sheet holding cassettes installed in the image forming apparatus. For example, in the case of a test chart image for confirming color deviation in color printing, density of each color, and grayscale, test chart images do not need to be printed on sheets conveyed from all of the sheet holding cassettes, and confirmation can be performed by printing a test chart image on a sheet conveyed from one sheet holding cassette.

Then, in confirming the printing operation, a test chart image that needs to be printed to sheets conveyed from all of the sheet holding cassettes and a test chart image that needs to be printed on only a sheet conveyed from one sheet holding cassette both may need to be used. However, with the known technology described above, in the case of consecutively selecting all of the sheet holding cassettes and printing a specific test chart image, printing of test chart images of different types cannot be consecutively performed. Thus, the task of confirmation takes too much time.

SUMMARY OF THE INVENTION

The present invention enables realization of technology for consecutive printing when printing a plurality of test chart images with different confirmation perspectives of a printing operation.

One aspect of the present invention provides an image forming apparatus comprising: a plurality of sheet holding units each configured to hold a sheet; a printing unit configured to print an image; one or more memory devices that store a set of instructions; and one or more processors that execute the set of instructions to: receive a print setting for a first type test chart image to be printed on sheets conveyed from all of the plurality of sheet holding units and for a second type test chart image to be printed on a sheet conveyed from at least one sheet holding unit of the plurality of sheet holding units, and control the printing unit on a basis of the print setting to convey sheets from each of the plurality of sheet holding units and print the first type test chart image and following thereafter convey a sheet from the at least one sheet holding unit from among the plurality of sheet holding units and print the second type test chart image.

Another aspect of the present invention provides a control method for an image forming apparatus comprising a plurality of sheet holding units each configured to hold a sheet and a printing unit configured to print an image, the method comprising: receiving a print setting for a first type test chart image to be printed on sheets conveyed from all of the plurality of sheet holding units and for a second type test chart image to be printed on a sheet conveyed from at least one sheet holding unit; and controlling the printing unit on a basis of the print setting to convey sheets from each of the plurality of sheet holding units and print the first type test chart image and following thereafter convey a sheet from the at least one sheet holding unit from among the plurality of sheet holding units and print the second type test chart image.

Still another aspect of the present invention provides a non-transitory computer-readable storage medium, the storage medium storing a program for causing a computer to execute each step of a method of controlling an image forming apparatus comprising a control unit, a plurality of sheet holding units each configured to hold a sheet, and a printing unit configured to print an image, the method comprising: receiving a print setting for a first type test chart image to be printed on sheets conveyed from all of the plurality of sheet holding units and for a second type test chart image to be printed on a sheet conveyed from at least one sheet holding unit; and controlling the printing unit on a basis of the print setting to convey sheets from each of the plurality of sheet holding units and print the first type test chart image and following thereafter convey a sheet from the at least one sheet holding unit from among the plurality of sheet holding units and print the second type test chart image.

Further features of the present invention will be apparent from the following description of exemplary embodiments with reference to the attached drawings.

DESCRIPTION OF THE EMBODIMENTS

Figure 1:
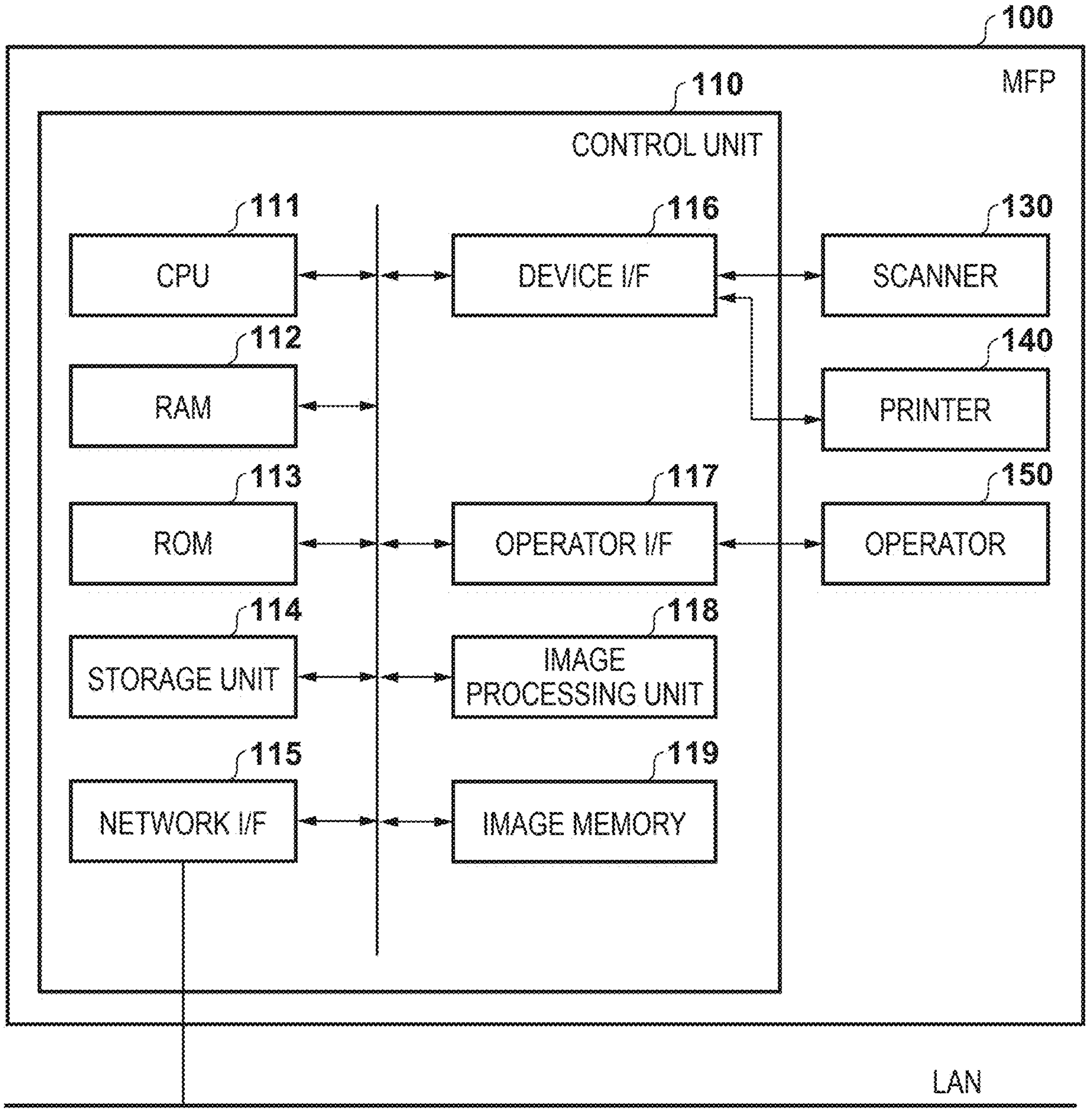
FIG. 1 is a block diagram of an MFP 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The configuration of an MFP 100, which is an image forming apparatus according to the present invention, will be described with reference to FIG. 1. The MFP 100 of the present invention includes a control unit 110, a scanner 130, a printer 140, and an operation unit 150.

The control unit 110 includes a CPU 111, a RAM 112, a ROM 113, a storage unit 114, a network I/F 115, a device I/F 116, an operation unit I/F 117, an image processing unit 118, and an image memory 119. The control unit 110 is connected to the scanner 130, an image input device, and the printer 140, an image print device, and controls the input and output of image information. Also, the control unit 110 is connected to a LAN and receives print jobs and the like via the LAN.

The CPU 111 controls the operations of the MFP 100 and operates on the basis of a program temporarily stored in the RAM 112. The ROM 113 is a boot ROM and stores the system boot program. The storage unit 114 stores system software, image data, programs for controlling the operations of the MFP 100, and the like. A program stored in the storage unit 114 is loaded to the RAM 112, and the CPU 111 controls the operations of the MFP 100 on the basis of this program.

The network I/F 115 is connected to the LAN and is involved with the input and output of various types of information via the network. The device I/F 116 connects the scanner 130 and the printer 140, image input and print devices, and the control unit 110 and performs synchronous or asynchronous conversion of image data. The operation unit I/F 117 is an interface that connects the operation unit 150 and the control unit 110 and outputs image data to be displayed on the operation unit 150 to the operation unit 150. Also, the operation unit I/F 117 transfers information input by the user form the operation unit 150 to the CPU 111. The image processing unit 118 executes image processing on the print data received via the LAN or executes image processing on the image data input/output by the device I/F 116. The image memory 119 is a memory for temporarily loading image data to be processed by the image processing unit 118.

The sheets used in printing by the MFP 100 are managed using a database referred to as a cassette library by an operator. The cassette library is stored in the storage unit 114 or the RAM 112 and is readable and writable as necessary via each software module. Known matters relating to a cassette library will not be described herein in detail.

Next, the structure and the operations of an image forming apparatus according to the present invention will be described.

Figure 2:
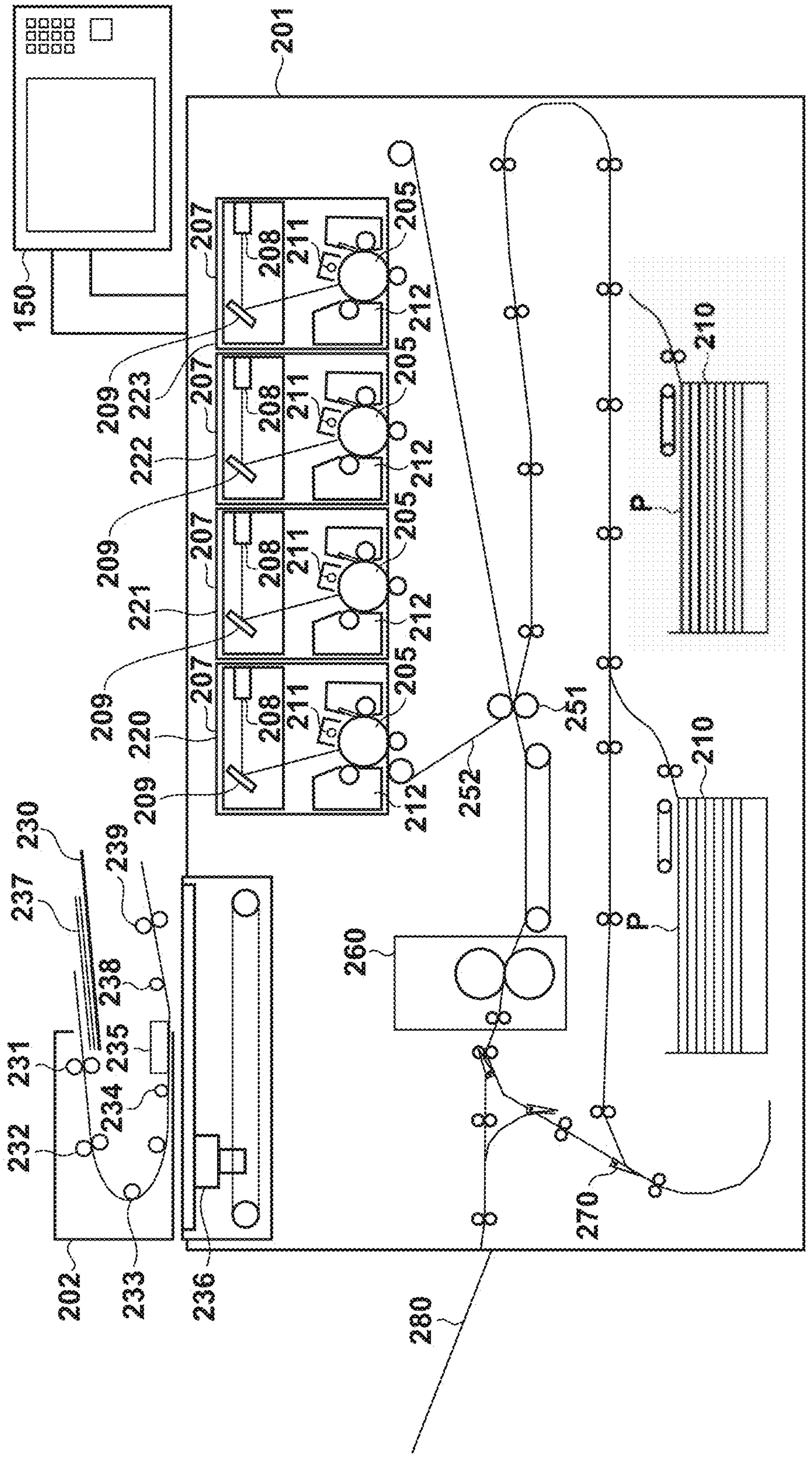
FIG. 2 is a cross-sectional view illustrating the structure of the MFP 100.

The structure of the MFP 100, which is an image forming apparatus according to the present embodiment, will now be described with reference to FIG. 2. As illustrated, the MFP 100 includes a casing 201. The casing 201 internally includes mechanisms for constituting an engine unit, an engine control unit that performs control relating to each print process processing (for example, conveying processing and the like) performed by each mechanism, and a control board storage unit that stores the printer controller.

The engine unit includes an optical processing mechanism for electrostatic latent image formation on a photosensitive drum 205 via laser light scanning, electrostatic latent image development, a multiplex transfer of developed images onto an intermediate transfer body 252, and a further transfer of the multiplex-transferred color image onto a sheet P. Also, the engine unit includes a fixing processing mechanism for fixing transferred toner images onto the sheet P, a supplying processing mechanism for supplying the sheet P, and a conveying processing mechanism for conveying the sheet P.

The optical processing mechanism includes a laser scanner unit 207. The laser scanner unit 207 includes a laser driver that drives the on and off of laser light emitted from a non-illustrated semiconductor laser in accordance with image data supplied from the printer controller. The laser light emitted from the semiconductor laser is sent out in a main scanning direction by a rotating polygon mirror 208. The laser light sent out in the main scan direction is guided to the photosensitive drum 205 via a reflective polygon mirror 209 and is exposed on the photosensitive drum 205 in the main scan direction. The photosensitive drum 205 is charged by a primary charging device 211. In this manner, an electrostatic latent image is formed on the photosensitive drum 205 via laser light scanning exposure. The electrostatic latent image is developed into a toner image by the toner supplied by a developing device 212. Then, the toner image developed on the photosensitive drum 205 is transferred (primary transfer) onto the intermediate transfer body 252 applied with a voltage of the opposite polarity to the toner image. When forming a color image, color images from a yellow (Y) station 220, a magenta (M) station 221, a cyan (C) station 222, and a black (K) station 223 are sequentially formed on the intermediate transfer body 252. As a result, a full color visual image is formed on the intermediate transfer body 252.

Also, the sheet P is conveyed by the conveying processing mechanism from a storage case (sheet holding cassette) 210 for transfer material (printing sheets). The sheet P is pressed against the intermediate transfer body 252 by a transfer roller 251 while the transfer roller 251 is applied with a voltage of the opposite polarity to the toner. In this manner, the visual image formed on the intermediate transfer body 252 is transferred (secondary transfer) onto the sheet P conveyed in synchronization in the conveyance direction (sub-scan direction) of the sheet P by the supplying processing mechanism. The sheet holding cassette is an example of a sheet holding unit of the present invention.

The post-secondary-transfer sheet P is passed through a fixing device 260 of the fixing processing mechanism. In this manner, the toner transferred onto the sheet P is heat-melted and fixed as an image on the sheet P. Note that in the case of double-sided printing, the sheet P is passed through an inverting unit 270 and switchback inverted. Then, by introducing the sheet P into the fixing processing mechanism again, a back surface image is transferred. Thereafter, by passing the sheet P through the fixing device 260 in a similar manner, the toner images are heated and fixed on the sheet P. The sheet Pis discharged to a discharge unit 280 to complete the printing process.

The operation unit 150 includes a touch panel, a keyboard, a mouse, or the like for the user to operate the MFP 100. Also, the operation unit 150 includes a liquid crystal display, LED, or the like for displaying the state of the MFP 100 and the operation screen.

Also, the MFP 100 includes a scanner 202. The scanner 202 corresponds to the scanner 130 illustrated in FIG. 1. The scanner 202 internally includes mechanisms constituting the scanner, a scanner control unit for performing control (for example, document conveying processing and the like) relating to document reading by the mechanisms, and a control board storage unit that stores the scanner control unit.

The mechanisms that constitute the scanner include conveyance rollers 231 and 232 for conveying a document 237 placed on a document conveying apparatus (ADF). A detection sensor 233 for detecting the passage of the conveyed document, a reading sensor 235 that reads the document image, and the like are also provided.

Figure 3:
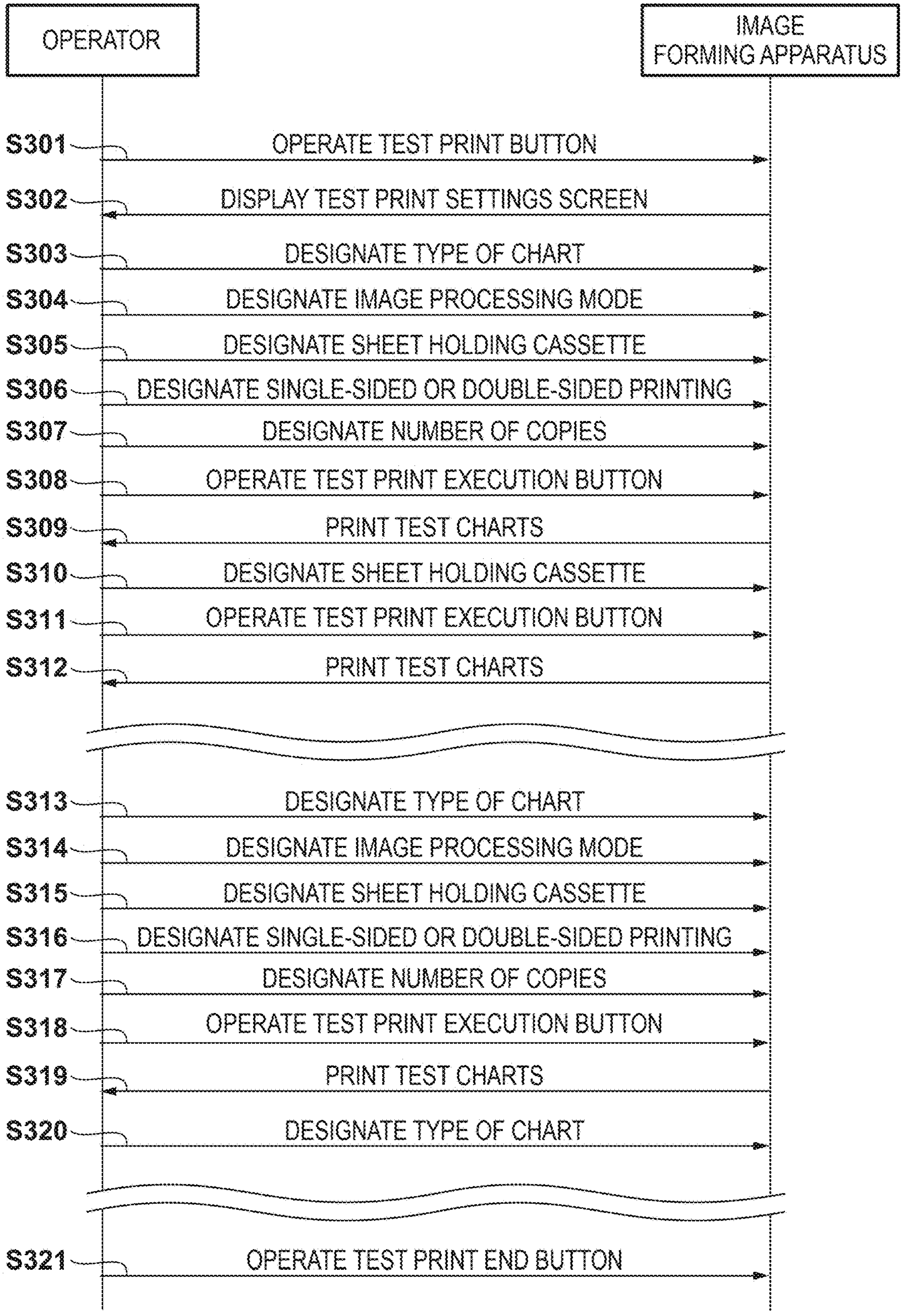
FIG. 3 is a diagram illustrating the sequence of a test chart print.

A sequence indicating a sequence of processing in an existing test chart print will now be described with reference to FIG. 3. Hereinafter, the step number of each process included in the sequence will be indicated by a number preceded by "S". This is the same for subsequent sequences also. In the test chart print, main interactions between the operator and the MFP 100, the image forming apparatus, are performed via the operation unit 150.

First, in S301, when the operator operates a test print button for printing a test chart image, the MFP 100 determines to start a test chart print. In S302, the MFP 100 displays a test chart print settings screen on the operation unit 150 via the CPU 111. Next, in S303 to S307, the operator sets the test chart print settings.

In S303, the type of test chart image to be printed in the test chart print is designated. The test chart image designated here is a test chart image printed on sheets conveyed from each sheet holding cassette for confirming the print operation. For example, the test chart image is for confirming the image position, in printing the image, by whether or not the margin is correctly located at the periphery of the printing paper. The test chart image enables confirmation of the image position in the printing operation and is, for example, a grid image printed on the entire printing paper. In other examples, an image of a density designated by the operator is printed on the entire printing paper, a geometric shape other than a grid is printed, or a combination a plurality of such images is used.

In S304, a mode for image processing such as error diffusion and screen is designated for printing halftone density.

In S305, one sheet holding cassette is designated for conveying a sheet for test chart printing.

In S306, whether to perform the test chart print with single-sided printing or double-sided printing is designated. In a case where double-sided printing is designated, the same test chart image designated in S303 is printed on both the front surface and the back surface by the MFP 100.

In S307, the number of test chart images to be printed is designated. In a case where printing of a plurality of sheets is designated, the MFP 100 repeatedly conveys sheets from the sheet holding cassette designated in S305 and prints test chart images.

When the test chart print settings are complete, in S308, the operator operates a test print execution button for printing the test chart imageand executes test chart print. When test chart print is executed, in S309, the MFP 100 prints the test chart images via the CPU 111. The printed test chart images (printed objects) are placed in a stack at the discharge unit 280 of the printer 140. The printer 140 is an example of a printing unit according to the present invention.

In a case where test chart print is performed by conveying a sheet from a sheet holding cassette other than the sheet holding cassette designated in S305 by the operator, the operator designates the sheet holding cassette again in S310. Then, in S311, the operator operates the test chart print execution button and executes test chart print. Accordingly, in S312, the MFP 100 conveys sheets from the sheet holding cassette designated in S310 and prints the test chart images via the CPU 111.

The operator repeats the operations described above for setting and the execution until printing on the sheets from all of the sheet holding cassettes for test chart print is complete.

When printing of the test chart image designated in S303 on the sheets conveyed from all of the sheet holding cassettes is completed, in S313, the operator, to confirm the printing operation from different perspectives, designates a type of test chart image different from the one designated in S303. The test chart image designated here is a test chart image that enables the printing operation to be confirmed by the test chart image being printed on a sheet conveyed from any one sheet holding cassette from among the sheet holding cassettes of the MFP 100. For example, when printing in color, the test chart image is for confirming that the print positions of each YMCK color match and that no color deviation has occurred. In other examples, the test chart image may be for confirming that an image with 100% density for each YMCK color is printed with the correct density, the test chart image may be for confirming that the tone of each YMCK color is printed with the correct density, or a combination of these images may be used.

In S314, the operator designates the mode for image processing such as error diffusion and screen for printing the halftone density with respect to the test chart image designated in S313.

In S315, the operator designates one sheet holding cassette for conveying a sheet for the test chart print designated in S313.

In S316, the operator designates whether to perform the test chart print with single-sided printing or double-sided printing. In a case where double-sided printing is designated, the same test chart image designated in S313 is printed on both the front surface and the back surface by the MFP 100.

In S317, the number of test chart images to be printed is designated. In a case where printing of a plurality of sheets is designated, the MFP 100 repeatedly conveys sheets from the sheet holding cassette designated in S315 and prints test chart images.

When the test chart print settings are complete, in S318, the operator operates a test chart print execution button and executes test chart print. When test chart print is executed, in S319, the MFP 100 prints the test chart images via the CPU 111. The printed test chart images (printed objects) are placed in a stack at the discharge unit 280 of the printer 140.

When printing the test chart image designated in S313 on the sheet conveyed from one sheet holding cassette is complete, in S321, as in S313, the operator designates the type of test chart image for confirming the printing operation from a further different perspective. Then, by repeatedly executing S313 to S319, the plurality of types of test chart images required for printing operation confirmation are printed. When the execution of the required test chart print is all complete, in S321, the operator operates a test print end button and ends the test chart print operation.

Figure 4:
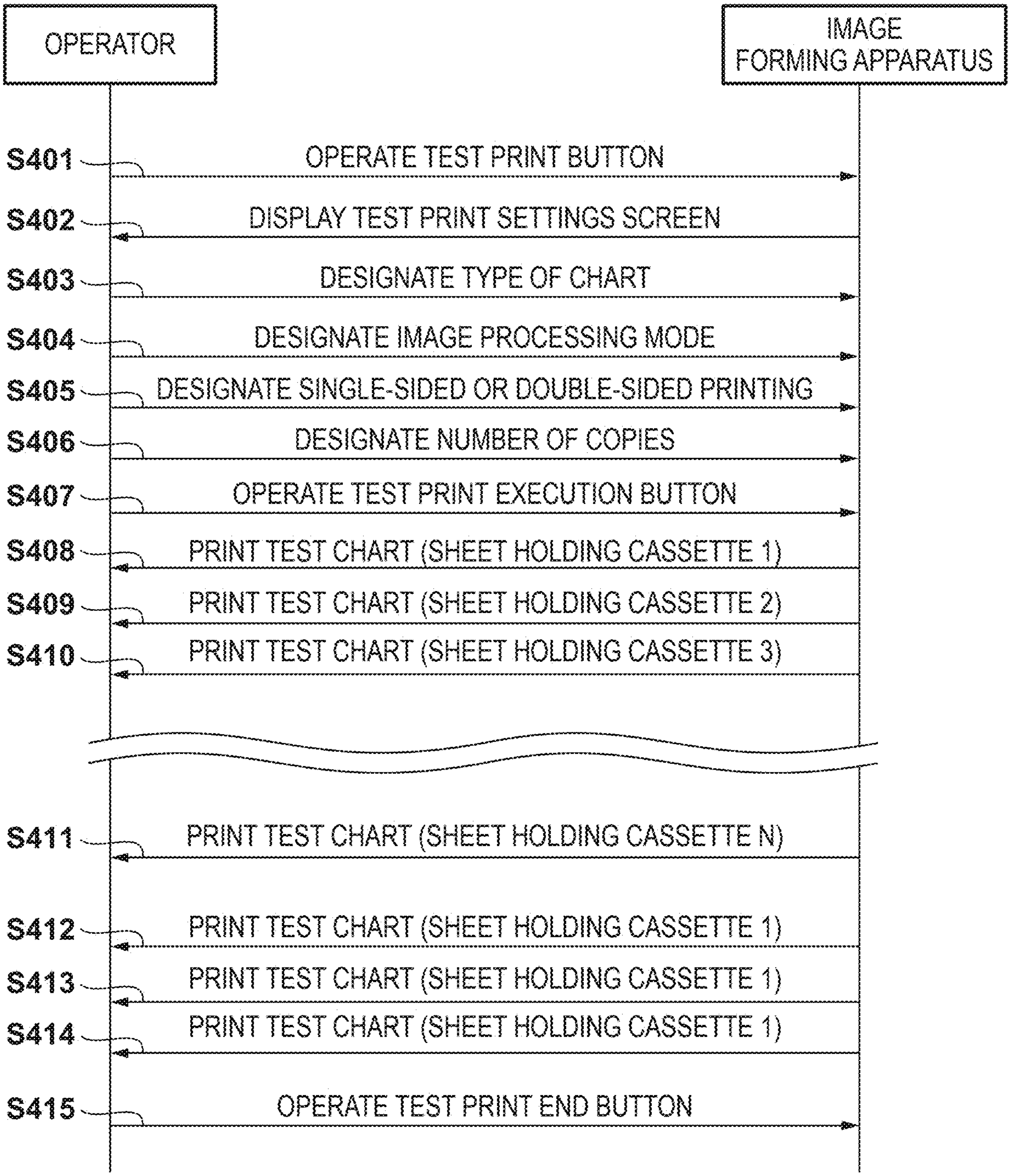
FIG. 4 is a diagram illustrating the sequence of a test chart print according to an embodiment.

A sequence indicating a sequence of processing in a test chart print according to the present embodiment will now be described with reference to FIG. 4. In the test chart print, main interactions between the operator and the MFP 100, the image forming apparatus, are performed via the operation unit 150. In the test chart print according to the present embodiment, after printing of the test chart images on the sheets conveyed from all of the sheet holding cassettes installed in the MFP 100 has been performed, a different test chart image is printed on a sheet conveyed from one sheet holding cassette.

First, in S401, when the operator operates a test print button for printing a test chart image, the MFP 100 determines to start a test chart print. In S402, the MFP 100, which is an image forming apparatus, displays a test chart print settings screen via the CPU 111. Next, in S403 to S406, the operator sets the test chart print settings.

In S403, the type of test chart image to be printed in the test chart print is designated by the operator. In S404, a mode for image processing such as error diffusion and screen is designated for printing halftone density by the operator. Here, the operator designates a combination of setting values indicating to print the test chart images on the sheets conveyed from all of the sheet holding cassettes and thereafter print the test chart image on the sheet conveyed from the one sheet holding cassette (hereinafter, this is referred to as a "consecutive operation").

In a case where the test chart image type and the image processing mode setting value designated by the operator is a specific combination, the MFP 100 determines that a consecutive operation has been designated. In the present embodiment, using an existing test chart image type and image processing mode, a consecutive operation can be designated or a dedicated mode designation button may be provided for enabling a consecutive operation to be designated.

In S405, the operator designates whether to perform the test chart print with single-sided printing or double-sided printing. In a case where double-sided printing is designated, the same test chart image is printed on both the front surface and the back surface by the MFP 100.

In S406, the number of test chart images to be printed is designated by the operator. In a case where printing of a plurality of sheets is designated, the MFP 100 conveys the designated number of sheets from all of the sheet holding cassettes and prints the test chart images on the sheets.

When the test chart print settings are complete, in S407, the operator operates a test print execution button for executing the test chart print and executes test chart print. When test chart print is executed, the MFP 100 prints the test chart images on the sheets conveyed in order from a sheet holding cassette 1 via the CPU 111. First, in S408, the MFP 100 prints the test chart image on the sheet from the sheet holding cassette 1. Next, in S409, the MFP 100 prints the test chart image on the sheet from the sheet holding cassette 2. Further, in a similar manner, in S410, the MFP 100 prints the test chart image on the sheet from the sheet holding cassette 3. In this manner, the test chart images are printed while switching between sheet holding cassettes in order. Then, in S411, the test chart image is printed on the sheet conveyed from a last sheet holding cassette N installed in the MFP 100. The printed test chart images (printed objects) are placed in a stack at the discharge unit 280 of the printer 140.

In a case where printing a plurality of test chart images is designated in S406, the test chart images are again printed on the sheets conveyed in order from the sheet holding cassette 1 and the designated number of test chart images is printed.

The test chart image printed here from S408 to S411 is a test chart image printed on sheets conveyed from each sheet holding cassette for confirming the printing operation. For example, the test chart image is for confirming the image position, in printing the image, by whether or not the margin is correctly located at the periphery of the printing paper. The test chart image enables confirmation of the image position in the printing operation and is, for example, a grid image printed on the entire printing paper. In other examples, an image of a density designated by the operator is printed on the entire printing paper, a geometric shape other than a grid is printed, or a combination a plurality of such images is used. Hereinafter, a test chart image printed on sheets conveyed from each sheet holding cassette for confirming the printing operation may be referred to as a first type test chart image.

In S408 to S411, when printing of the test chart images on the sheets conveyed from all of the sheet holding cassettes installed in the MFP 100 is complete, a different test chart image is then printed. The test chart image printed here is a test chart image that enables the printing operation to be confirmed by the test chart image being printed on a sheet conveyed from any one sheet holding cassette from among the sheet holding cassettes of the MFP 100. For example, when printing in color, the test chart image is for confirming that the print positions of each YMCK color match and that no color deviation has occurred. In other examples, the test chart image may be for confirming that an image with 100% density for each YMCK color is printed with the correct density, the test chart image may be for confirming that the tone of each YMCK color is printed with the correct density, or a combination of these images may be used. Hereinafter, a test chart image that is printed on a sheet conveyed from a certain sheet holding cassette for enabling printing operation confirmation may be referred to as a second type test chart image.

First, in S412, the MFP 100 conveys a sheet from the sheet holding cassette 1 and prints the second type test chart image different from the first type test chart image printed in from S408 to S411. Here, the sheet holding cassette where the sheet is conveyed from may be a sheet holding cassette other than the sheet holding cassette 1 and may be any one selected from the sheet holding cassettes installed in the MFP 100.

Next, in S413, the MFP 100 conveys a sheet from the sheet holding cassette 1 and prints a second type test chart image different from the second type test chart image of S412. As in S412, the sheet holding cassette where the sheet is conveyed from may be a sheet holding cassette other than the sheet holding cassette 1 and may be a sheet holding cassette other than the sheet holding cassette where the sheet is conveyed from in S412.

In S414, in a similar manner, the MFP 100 prints another different second type test chart image on a sheet conveyed from a certain sheet holding cassette installed in the MFP 100.

This operation is repeatedly executed, and when execution of the test chart print of the required second type test chart image is completed, in S412, the operator operates the test print end button and ends the test chart print operation.

Figure 5:
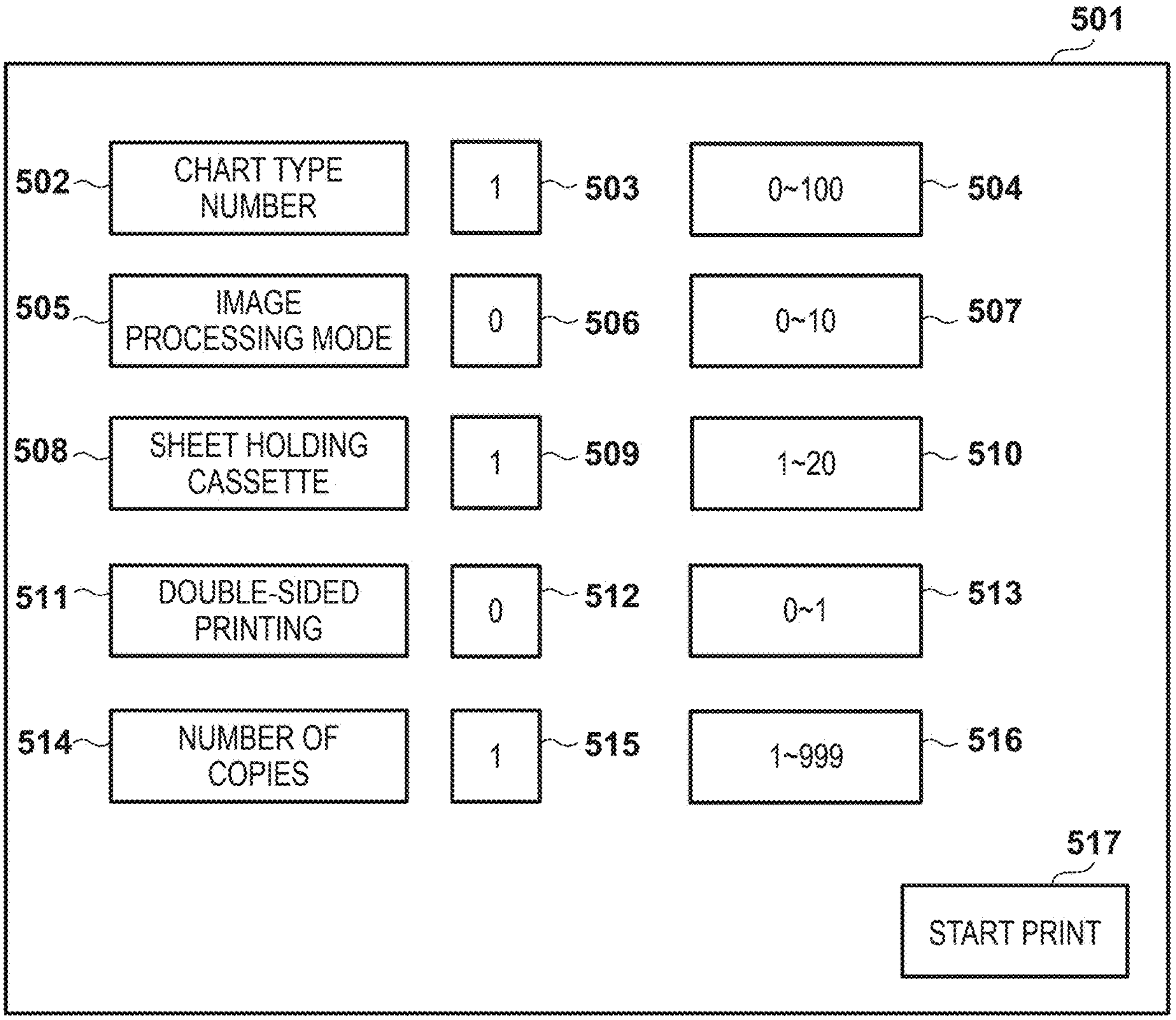
FIG. 5 is a diagram illustrating a screen displayed on an operation unit 150 according to an embodiment.

A test chart print settings screen displayed on the operation unit 150 in S302 of FIGS. 3 and S402 of FIG. 4 will now be described with reference to FIG. 5. In S301 and S401, when the operator operates the test chart print button, the CPU 111 displays a test chart print settings screen 501 on the operation unit 150.

Chart type numbers 502, 503, and 504 are items for setting the test chart image type to be designated by the operator in S303 and S403. 502 is an item for the setting item display, 504 is an item for displaying the setting value range, and 503 is an item where the setting value is entered. In a similar manner, image modes 505, 506, and 507 are items for setting the image processing mode to be designated by the operator in S304 and S404. Also, in a similar manner, sheet holding cassettes 508, 509, and 510 are items for setting the sheet holding cassette to be designated by the operator in S305. In a similar manner, double-sided printing 511, 512, and 513 are items for setting double-sided printing to be designated by the operator in S306 and S405. Also, number of copies 514, 515, and 516 are items for setting the number of test chart prints to be designated by the operator in S307 and S406.

A print start button 517 is an example of a test print execution button for executing test chart print operated by the operator in S308 and S407.

A test chart image in a test chart print according to the present embodiment will now be described with reference to FIGS. 6A to 6D.

Figure 6A:
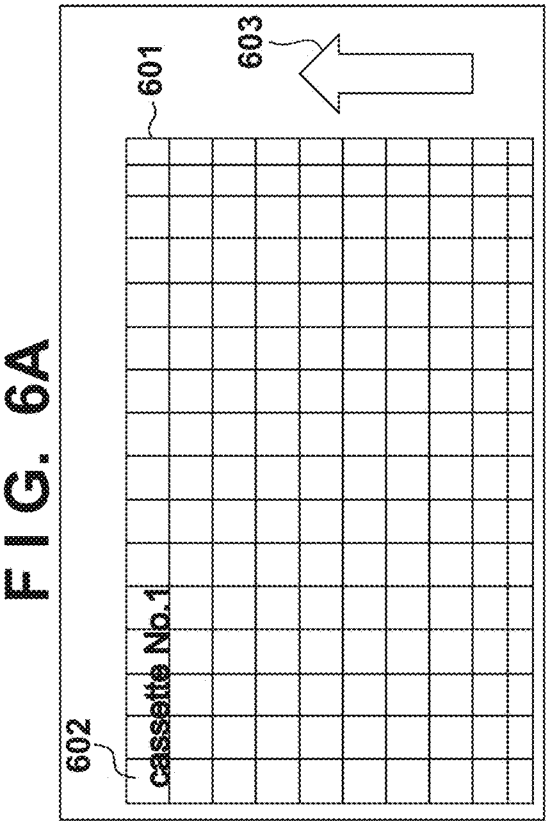
FIGS. 6A to 6D are diagrams illustrating examples of test chart images according to an embodiment.

A test chart image 601 of FIG. 6A illustrates an example of printing a first type test chart image printed with a grid image as the test chart image for confirming the printing operation printed on the sheets conveyed from all of the sheet holding cassettes. As described above, the test chart image printed in the present embodiment is not limited to a grid and another geometric shape, an image of a density designated by the operator, or a combination of these images, may be used, for example.

An identification character string 602 "cassette No. 1" is a character string indicating the number of the sheet holding cassette that conveyed a sheet for printing of the test chart image. In the test chart print according to the present embodiment, a character string that can identify the sheet holding cassette that conveyed the sheet is printed in the test chart image. As long as the character string to be printed can identify a sheet holding cassette, instead of the identification character string 602, simply the number of symbol of a sheet holding cassette may be printed.

An arrow 603 indicates the conveyance direction of the sheet when the MFP 100 prints the test chart image. By printing the identification character string 602 of the sheet holding cassette at a constant specific position with respect to the sheet conveyance direction, the print orientation of the test chart image can be identified. FIG. 6A illustrates an example in which the identification character string 602 of the sheet holding cassette is printed in an upper left position with respect to the sheet conveyance direction.

Figure 6B:
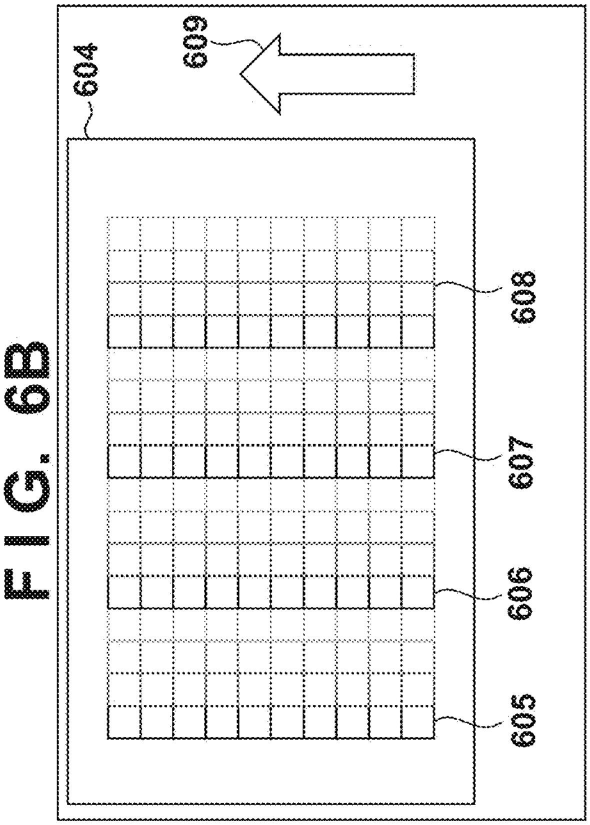

A test chart image 604 of FIG. 6B illustrates an example of printing a color deviation confirmation image as the second type test chart image for confirming the printing operation printed on the sheet conveyed from one of the sheet holding cassettes of the MFP 100. Grid images 605 to 608 illustrate grid images of each YMCK color. The test chart image enables confirmation of color deviation due to the grid images being printed in contact. An arrow 609 indicates the conveyance direction of the sheet when the MFP 100 prints the test chart image.

Figure 6C:
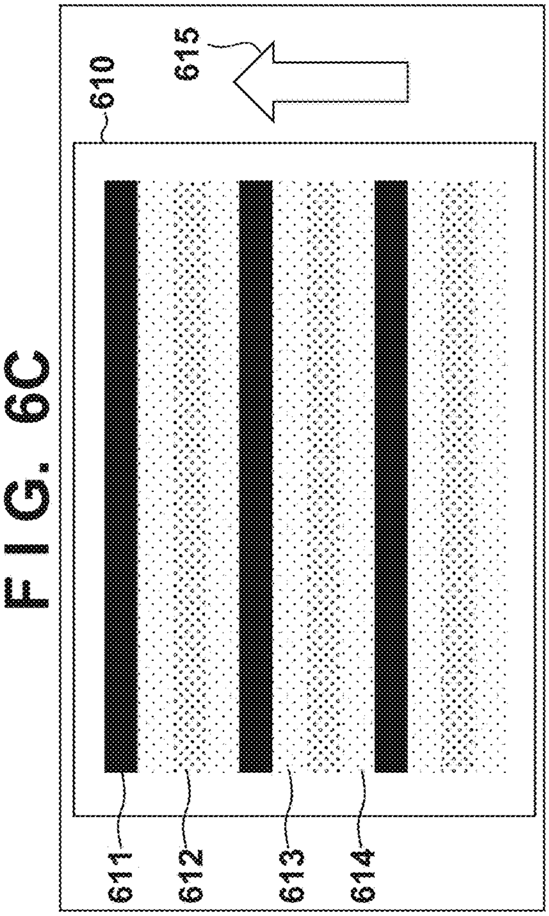

A test chart image 610 of FIG. 6C illustrates an example of printing an image for confirming the print density of an image with 100% density for each YMCK color as the second type test chart image. Band images 611 to 614 illustrate band images with 100% density for each YMCK color. The test chart image enables confirmation of the print density due to the band images being repeatedly printed with the width of the sheet in the sheet conveyance direction. An arrow 615 indicates the conveyance direction of the sheet when the MFP 100 prints the test chart image.

Figure 6D:
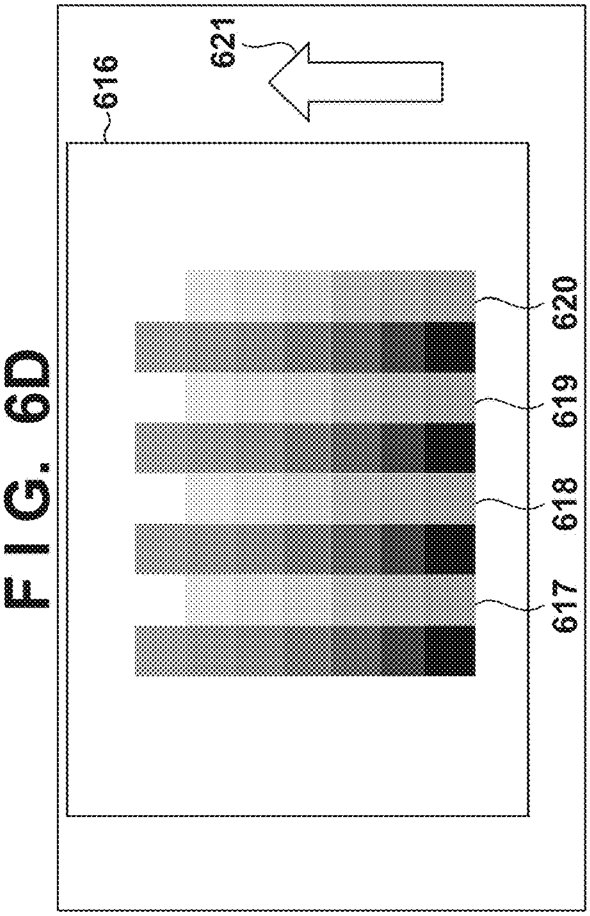

A test chart image 616 of FIG. 6D illustrates an example of printing an image for confirming the tone of each YMCK color as the second type test chart image. Patch images 617 to 620 illustrate patch images with from 0% to 100% density for each YMCK color. Accordingly, this test chart image enables confirmation of the tone of each color. An arrow 621 indicates the conveyance direction of the sheet when the MFP 100 prints the test chart image.

Figure 7A:
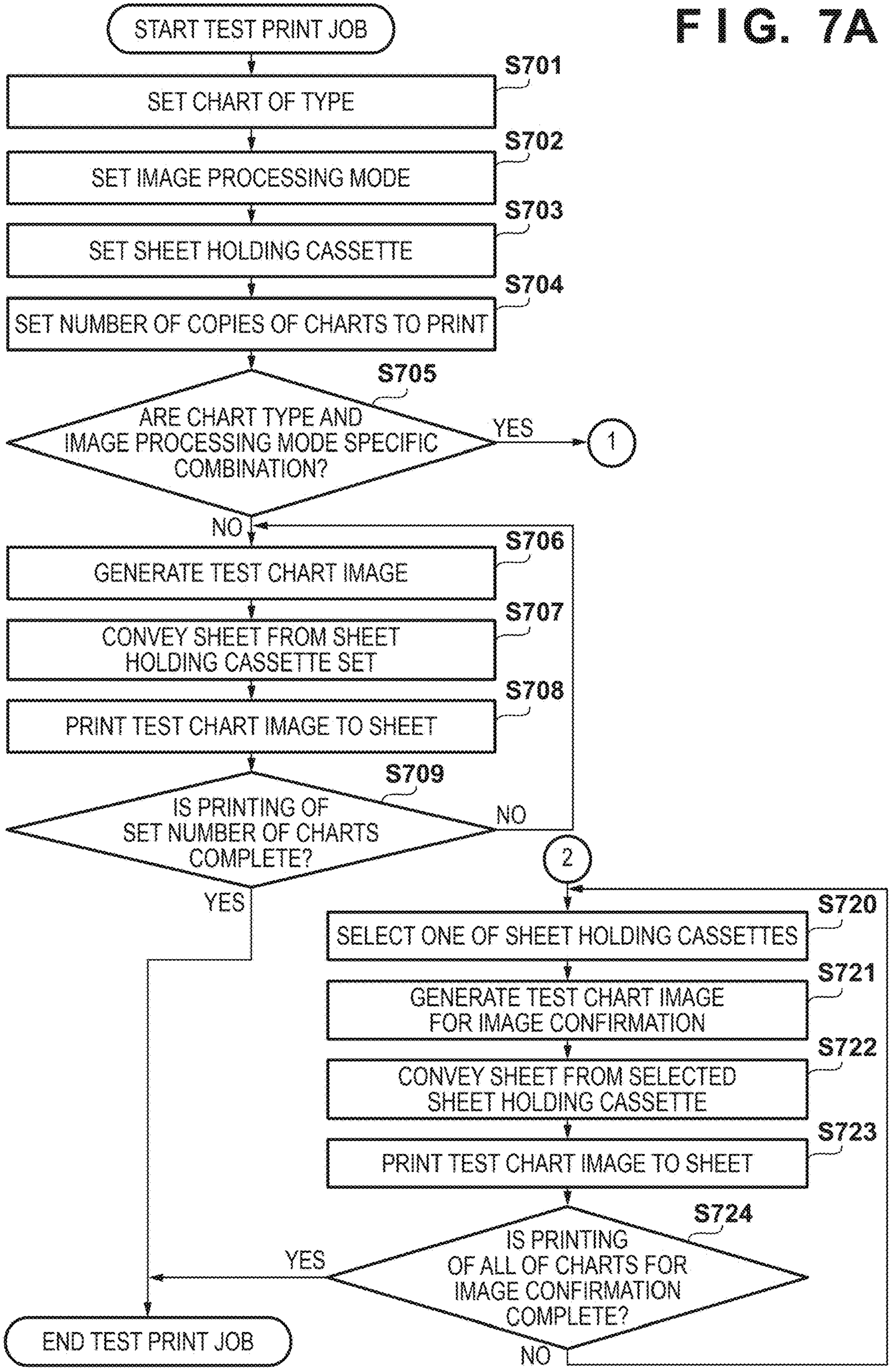
FIGS. 7A and 7B are flowcharts of a test chart print according to an embodiment.
Figure 7B:
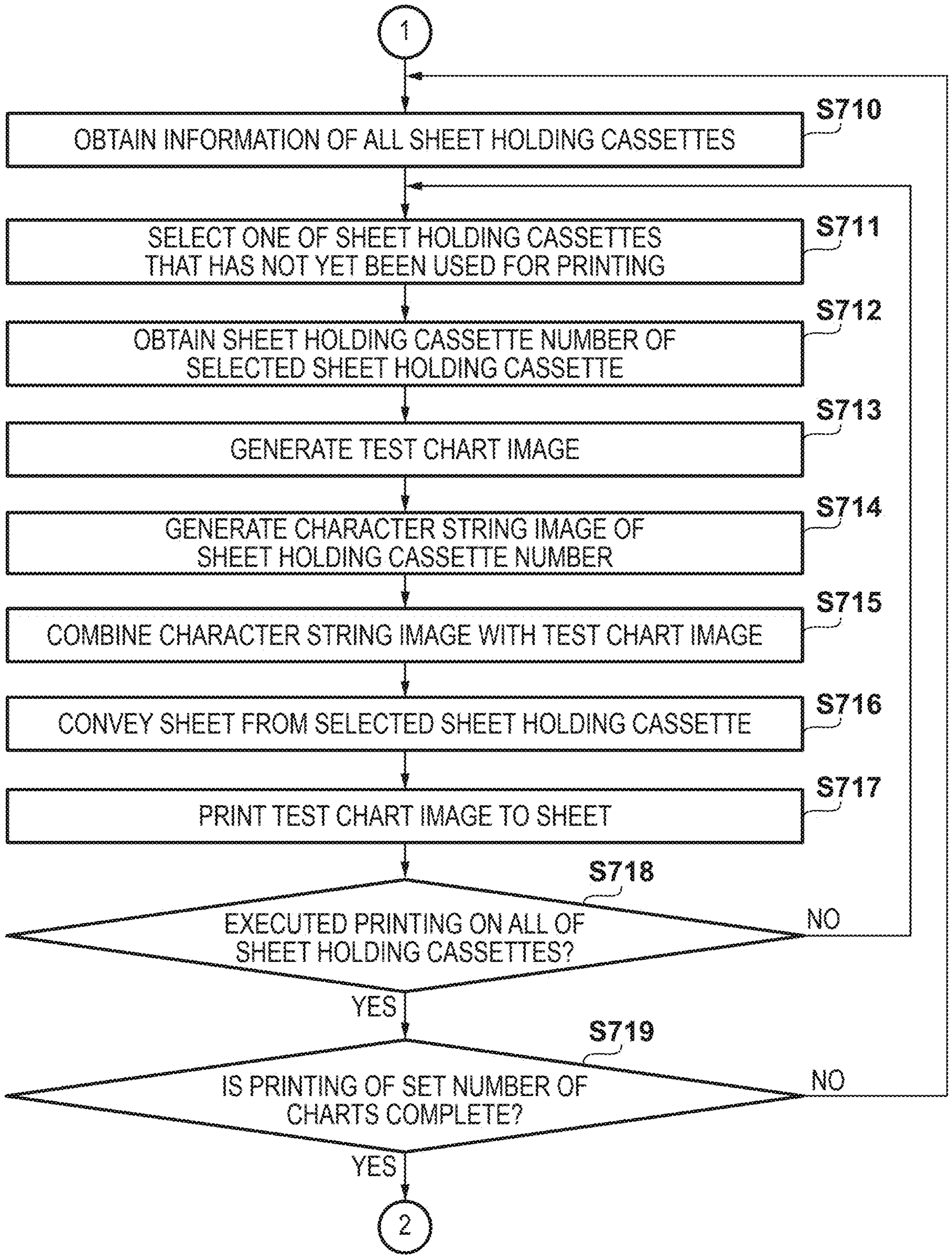

Next, the test chart print processing according to the present embodiment illustrated by the sequence in FIG. 4 will be described with reference to FIGS. 7A and 7B. The processing described below is implemented by the CPU 111 of the MFP 100 reading out a program stored in the storage unit 114 onto the RAM 112 and executing the program, for example. Hereinafter, the step number of each process included in the flowchart will be indicated by a number preceded by "S". This is the same for subsequent flowcharts also.

In S701 to S704, the CPU 111 displays the test chart print settings screen 501 on the operation unit 150 and receives a test chart print setting from the operator via the operation unit 150. In S701, a setting for the test chart image type described in S303 and S403 is received and the setting value is stored in the RAM 112, and in S702, a setting for the image processing mode described in S304 and S404 is received and the setting value is stored in the RAM 112. Also, in S703, a setting for the sheet holding cassette described in S305 is received and the setting value is stored in the RAM 112, and in S704, a setting for the number of test chart prints described in S307 and S406 is received and the setting value is stored in the RAM 112.

Next, when the operator operates the test print execution button (print start button) 517 via the operation unit 150, the CPU 111 proceeds the processing to S705. In S705, the CPU 111 performs determination for the test chart image type setting and the image processing mode setting received in S701 and S702. Here, the CPU 111 determines whether the setting is designating a consecutive operation of printing the test chart images on sheets conveyed from all of the sheet holding cassettes as described in S403 and S404 and printing a different test chart image on a sheet conveyed from one sheet holding cassette.

In S705, in a case where the setting does not designate consecutive operation (No), the processing proceeds to S706, and the CPU 111 generates a test chart image of the type set in S701. Then, in S706, the CPU 111 executes image processing of the image processing mode set in S702 via the image processing unit 118 and stores the processed image data in the image memory 119.

Then, in S707, the CPU 111 conveys one printing sheet from the sheet holding cassette set in S703. In S708, for the sheet conveyed in S707, the CPU 111 reads out the test chart image data generated in S706 from the image memory 119, transmits the test chart image data to the printer 140, and prints the test chart image on the printing sheet.

In S709, the CPU 111 determines whether or not printing of the number of test chart images set in S704 is complete.

In a case where printing of the set number is not complete (No), the processing returns to S706, and the CPU 111 executes the processing from S706 again. In a case where printing of the set number is complete (Yes), the CPU 111 ends the test chart print processing.

On the other hand, in S705, in a case where it is determined that the setting designates consecutive operation (Yes), the processing proceeds to S710, and the CPU 111 obtains the information of all of the sheet holding cassettes installed in the MFP 100. Then, the processing proceeds to S711, and the CPU 111 selects one of the sheet holding cassettes that has not yet been used for test chart image printing. Next, in S712, the sheet holding cassette number for identifying the selected sheet holding cassette is obtained. Here, the sheet holding cassette number may be a symbol or the like other than a number that indicates information that can identify the sheet holding cassette. Also, the MFP 100 may have a configuration which includes only one sheet holding cassette.

Next, in S713, the CPU 111 generates a test chart image and executes image processing via the image processing unit 118, and the processed image data is stored in the image memory 119. Here, the generated test chart image is the first type test chart image for confirming the printing operation printed on sheets conveyed from each sheet holding cassette as described above. For example, it may be the test chart image 601 described using FIG. 6A. In an example according to the present embodiment, in a case where a consecutive operation is performed of printing the test chart images on the sheets conveyed from all of the sheet holding cassettes and printing the different test chart image on the sheet convey from the one sheet holding cassette, the test chart image type and the image processing mode used are predetermined. However, even in the case of printing the test chart image on the sheets conveyed from all of the sheet holding cassettes, the test chart image type and the image processing mode may be made able to be set, and the test chart image may be generated using the set test chart image type and image processing mode.

Next, in S714, the CPU 111 generates the identification character string (sheet holding cassette number) 602 for printing the sheet holding cassette number obtained in S712 in the test chart image. As described above, the identification character string (sheet holding cassette number) 602 may be only a number or a symbol as long as the sheet holding cassette can be identified. Then, in S715, the CPU 111 combines the character string image of the identification character string 602, which is the generated sheet holding cassette number, and the test chart image generated in S713 and stores the combined image data in the image memory 119.

Next, in S716, the CPU 111 conveys one printing sheet from the sheet holding cassette selected in S711. Then, in S717, for the sheet conveyed in S716, the CPU 111 reads out the test chart image data combined in S715 from the image memory 119, transmits the test chart image data to the printer 140, and the printer 140 prints the test chart image on the printing sheet.

Then, in S718, the CPU 111 determines whether or not printing of the test chart images on the sheets conveyed from all of the sheet holding cassettes installed in the MFP 100 is complete. In a case where there are still sheet holding cassettes that have not been used for printing a test chart image on a sheet (No), the processing returns to S711, and, again, the CPU 111 selects one of the sheet holding cassettes that have not been used for printing a test chart image on a conveyed sheet and executes processing to print the test chart image on a sheet conveyed from that sheet holding cassette.

On the other hand, in a case where printing of the test chart image on the sheets conveyed from all of the sheet holding cassettes is complete (Yes), the processing proceeds to S719, and the CPU 111 determines whether or not printing of the number of copies of the test chart image set in S704 is complete. In a case where printing of the set number is not complete (No), the processing returns to S710, and the CPU 111 executes processing to print the test chart image on the sheets conveyed from all of the sheet holding cassettes again.

In S710, in a case where printing of the set number is complete (Yes), the processing proceeds to S720, and the CPU 111 prints the second type test chart image. In S720, the CPU 111 selects one of the sheet holding cassettes for printing the test chart image on a sheet. The sheet holding cassette may be selected by selecting the first sheet holding cassette via the identification information, such as the number, of the sheet holding cassettes or by a different selection method. Also, a different sheet holding cassette may be selected each time the processing of S720 is executed.

Next, in S721, the CPU 111 generates a test chart image and executes image processing via the image processing unit 118, and the processed image data is stored in the image memory 119. The test chart image for image confirmation generated here is a second type test chart image for confirming the printing operation by the test chart image being printed on a sheet conveyed from any one sheet holding cassette from among the sheet holding cassettes installed in the MFP 100 as described above. For example, it may be one of the test chart images described using FIGS. 6B to 6D. In an example according to the present embodiment, the test chart image type and the image processing mode described above are a predetermined type and mode. The test chart image type and the image processing mode may be made able to be set, and the test chart image may be generated using the set test chart image type and image processing mode.

Next, in S722, the CPU 111 conveys one printing sheet from the sheet holding cassette selected in S720. In S723, for the sheet conveyed in S722, the CPU 111 reads out the test chart image data from the image memory 119 and transmits the test chart image data to the printer 140. Then, the printer 140 prints the test chart image on the printing sheet.

In S724, the CPU 111 determines whether or not printing of all of the test chart images for image confirmation to be printed is complete. In a case where there are still test chart images for image confirmation that have not been printed (No), the processing returns to S720, and the CPU 111 again executes processing to print the test chart image from the selection of sheet holding cassettes to be used for printing the test chart image on the conveyed sheet.

On the other hand, in S724, in a case where printing of all of the test chart images for image confirmation to be printed is complete (Yes), the CPU 111 ends the test chart print processing.

Accordingly, with one operation, consecutive operation can be executed, the consecutive operation including a test chart print of printing the first type test chart images on the sheets conveyed from all of the sheet holding cassettes and a test chart print of printing the second type test chart image on the sheet conveyed from one sheet holding cassette.

Note that the present example described above is executed as a test chart print function operated by the operator, that is, the person in charge of service, but it is similarly applicable to a function operated by a user.

Second Embodiment

Hereinafter, the second embodiment for implementing the present invention will be described using diagrams. In the second embodiment, in addition to a character string for identifying the sheet holding cassette being printed in the test chart image, a character string for identifying the device of the MFP 100 and the test chart image execution date and time are also printed. Parts that are the same as in the first embodiment are not described, and only the differences will be described.

Figure 8A:
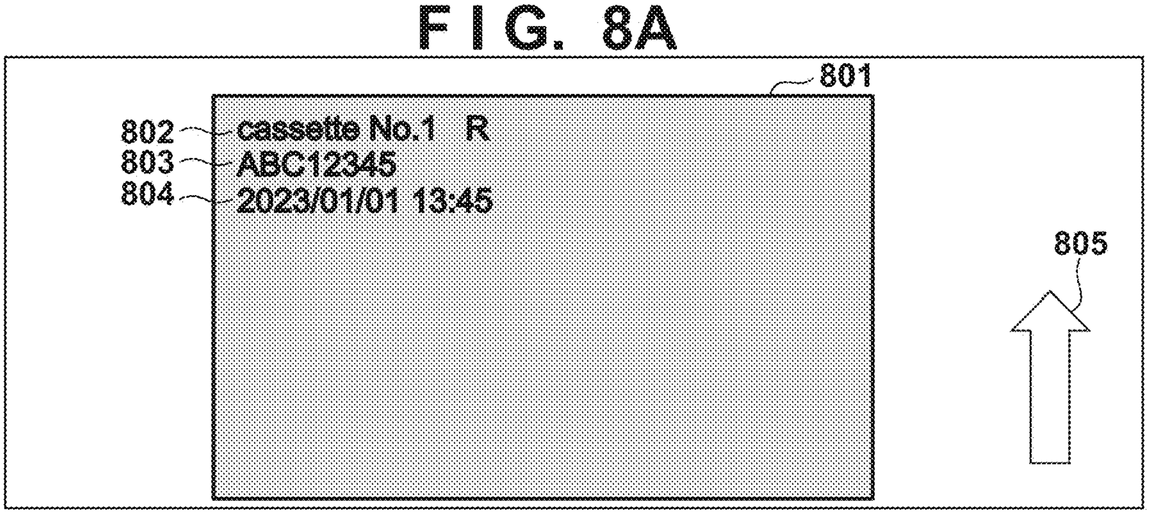
FIGS. 8A to 8C are diagrams illustrating examples of test chart images according to an embodiment.
Figure 8B:
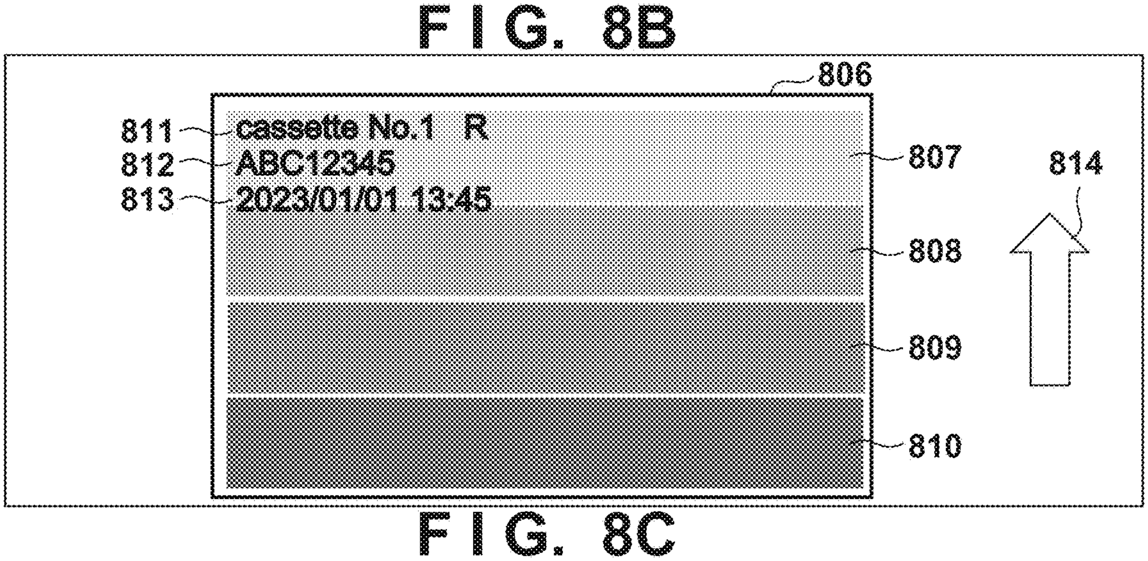
Figure 8C:
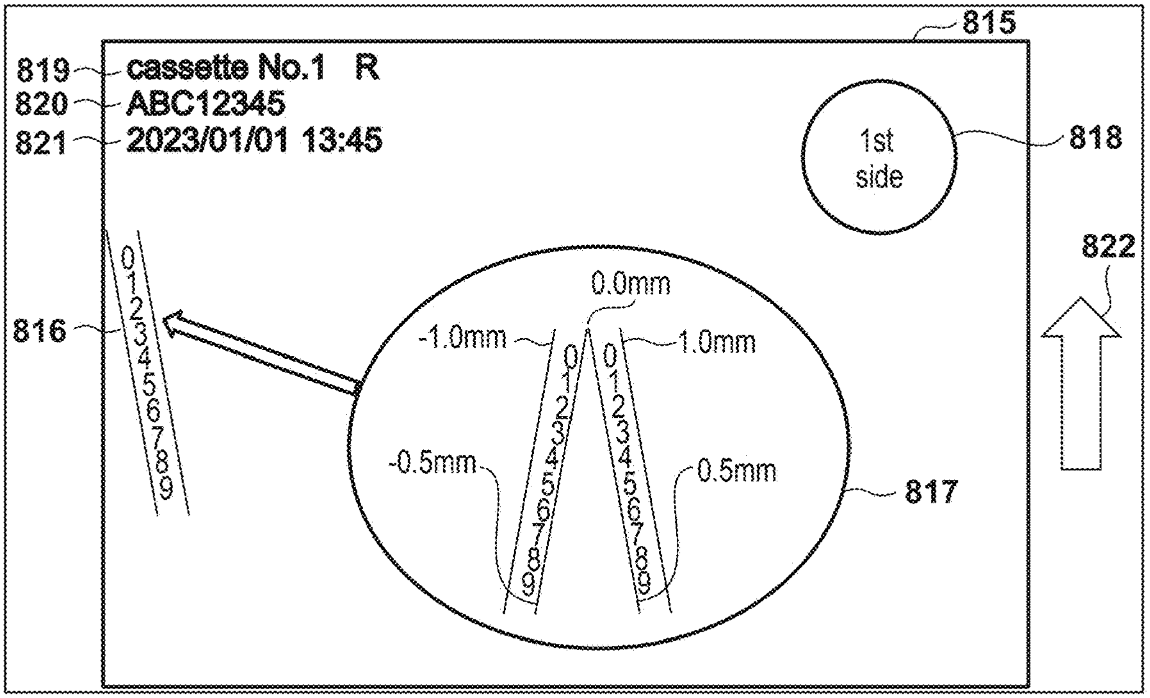

FIGS. 8A to 8C illustrate examples of test chart images printed in the test chart print according to the present embodiment. A test chart image 801 of FIG. 8A is an example of printing an image with halftone density as the first type test chart image. As described in the first embodiment, the test chart image to be printed in the present embodiment is not limited to a specific image, and a grid or similar geometric shape or a combination of images may be used.

An identification character string 802 "cassette No. 1 R" is a character string indicating the number of the sheet holding cassette that conveyed a sheet for printing of the test chart image. In the test chart print according to the present embodiment, a character string that can identify the sheet holding cassette that conveyed the sheet is printed in the test chart image. As long as the character string to be printed can identify a sheet holding cassette, instead of the identification character string 802, simply the number of symbol of a sheet holding cassette may be printed.

A device number 803 "ABC12345" is a character string indicating a device number for identifying the device of the MFP 100. In the test chart print according to the present embodiment, in an environment where there are a plurality of image forming apparatuses installed, the device number is printed as a character string that enables the image forming apparatus that printed the test chart image to be identified. As long as the information can identify the device of the image forming apparatus, information other than the device number denoted by 803 may be used.

A printed date and time 804 "2023/01/01 13:45" is a character string indicating the date and time that the test chart print was executed. In the test chart print according to the present embodiment, in a case where a test chart print was executed a plurality of times with the same image forming apparatus, the date and time is printed as a character string that enables the date and time that printing was executed to be identified. The date and time may be a character string in a form other than that indicated by 804.

An arrow 805 indicates the conveyance direction of the sheet when the MFP 100 prints the test chart image. By printing the identification character string 802 of the sheet holding cassette, the device number 803 of the image forming apparatus, and the test chart printed date and time 804 at a constant specific position with respect to the sheet conveyance direction, the print orientation of the test chart image can be identified. FIG. 8A illustrates an example in which the identification information (802, 803, and 804) is printed in an upper left position with respect to the sheet conveyance direction.

A test chart image 806 of FIG. 8B is an example of printing an image with halftone density of four colors as the second type test chart image. In this example, as the test chart image printed in the present embodiment, the image does not need to be only a monochrome image, and an image printed in color may be used. The images printed in each color in FIG. 8B include a band image 807 with halftone density printed in yellow, a band image 808 that is similar but in magenta, a band image 809 that is similar but in cyan, and a band image 810 that is similar but in black. The test chart image is not limited to a halftone density image, and a four-color grid or similar geometric shape, a combination of images, a color image of only one color of YMCK, or the like may be used.

As in FIG. 8A, an identification character string 811 "cassette No. 1 R" is a character string indicating the number of the sheet holding cassette that conveyed a sheet for printing of the test chart image. In the test chart print according to the present embodiment, a character string that can identify the sheet holding cassette that conveyed the sheet is printed in the test chart image. As long as the character string to be printed can identify a sheet holding cassette, instead of the identification character string 811, simply the number of symbol of a sheet holding cassette may be printed.

In a similar manner, a device number 812 "ABC12345" is a character string indicating a device number for identifying the device of the MFP 100. In the test chart print according to the present embodiment, in an environment where there are a plurality of image forming apparatuses installed, the device number is printed as a character string that enables the image forming apparatus that printed the test chart image to be identified. As long as the information can identify the device of the image forming apparatus, information other than the device number denoted by 812 may be used.

A printed date and time 813 is a character string indicating the date and time that the test chart print was executed. In the test chart print according to the present embodiment, in a case where a test chart print was executed a plurality of times with the same image forming apparatus, the date and time is printed as a character string that enables the date and time that printing was executed to be identified. The date and time may be a character string in a form other than that indicated by 813.

An arrow 814 indicates the conveyance direction of the sheet when the MFP 100 prints the test chart image. By printing the identification character string 811 of the sheet holding cassette, the device number 812 of the image forming apparatus, and the test chart image printed date and time 813 at a constant specific position with respect to the sheet conveyance direction, the print orientation of the test chart image can be identified. FIG. 8B illustrates an example in which the identification information (811, 812, and 813) is printed in an upper left position with respect to the sheet conveyance direction.

A test chart image 815 of FIG. 8C is an example of printing an image for adjusting an image printing position as the first type test chart image. The image for adjusting a printing position corresponds to an image generated in advance as image data that is stored in the storage unit 114 of the MFP 100, read out from the storage unit 114 when executing a test chart print, and printed on a printing sheet. In this manner, as a test chart image to be printed according to the present embodiment, printed image data may be used. A scale 816 of FIG. 8C indicates a scale for confirming printing position deviation. The image enables image printing position deviation to be confirmed via the print state of the scale. The display 817 is an explanation of the confirmation method of the scale 816 for printing position confirmation. It explains the determination method of the deviation amount of the printing position according to the print state of the scale for printing position confirmation. The operator can reference the scale 816 and the display 817 of the printed test chart image and determine the printing position deviation amount. A display 818 indicates whether or not the print surface of the test chart image is the front surface, and via this, it can be determined which surface of the printing sheet with the printed test chart image is the front and which is the back surface. As the test chart image obtained by printing image data, images other than the image for adjusting the image printing position denoted by 815 may be used, with examples including an image for adjusting an item other than the image printing position and printing an image for operation confirmation.

As in FIG. 8A, an identification character string 819 "cassette No. 1 R" is a character string indicating the number of the sheet holding cassette that conveyed a sheet for printing of the test chart image. In the test chart print according to the present embodiment, a character string that can identify the sheet holding cassette that conveyed the sheet is printed in the test chart image. As long as the character string to be printed can identify a sheet holding cassette, instead of the identification character string 819, simply the number of symbol of a sheet holding cassette may be printed.

In a similar manner, a device number 820 "ABC12345" is a character string indicating a device number for identifying the device of the MFP 100. In the test chart print according to the present embodiment, in an environment where there are a plurality of image forming apparatuses installed, the device number is printed as a character string that enables the image forming apparatus that printed the test chart image to be identified. As long as the information can identify the device of the image forming apparatus, information other than the device number denoted by 820 may be used.

A printed date and time 821 is a character string indicating the date and time that the test chart print was executed. In the test chart print according to the present embodiment, in a case where a test chart print was executed a plurality of times with the same image forming apparatus, the date and time is printed as a character string that enables the date and time that printing was executed to be identified. The printed date and time may be a character string in a form other than that indicated by 821.

An arrow 822 indicates the conveyance direction of the sheet when the MFP 100 prints the test chart image. By printing the identification character string 819 of the sheet holding cassette, the device number 820 of the image forming apparatus, and the test chart image printed date and time 821 at a constant specific position with respect to the sheet conveyance direction, the print orientation of the test chart image can be identified. FIG. 8C illustrates an example in which the identification information (819, 820, and 821) is printed in an upper left position with respect to the sheet conveyance direction.

Figure 9A:
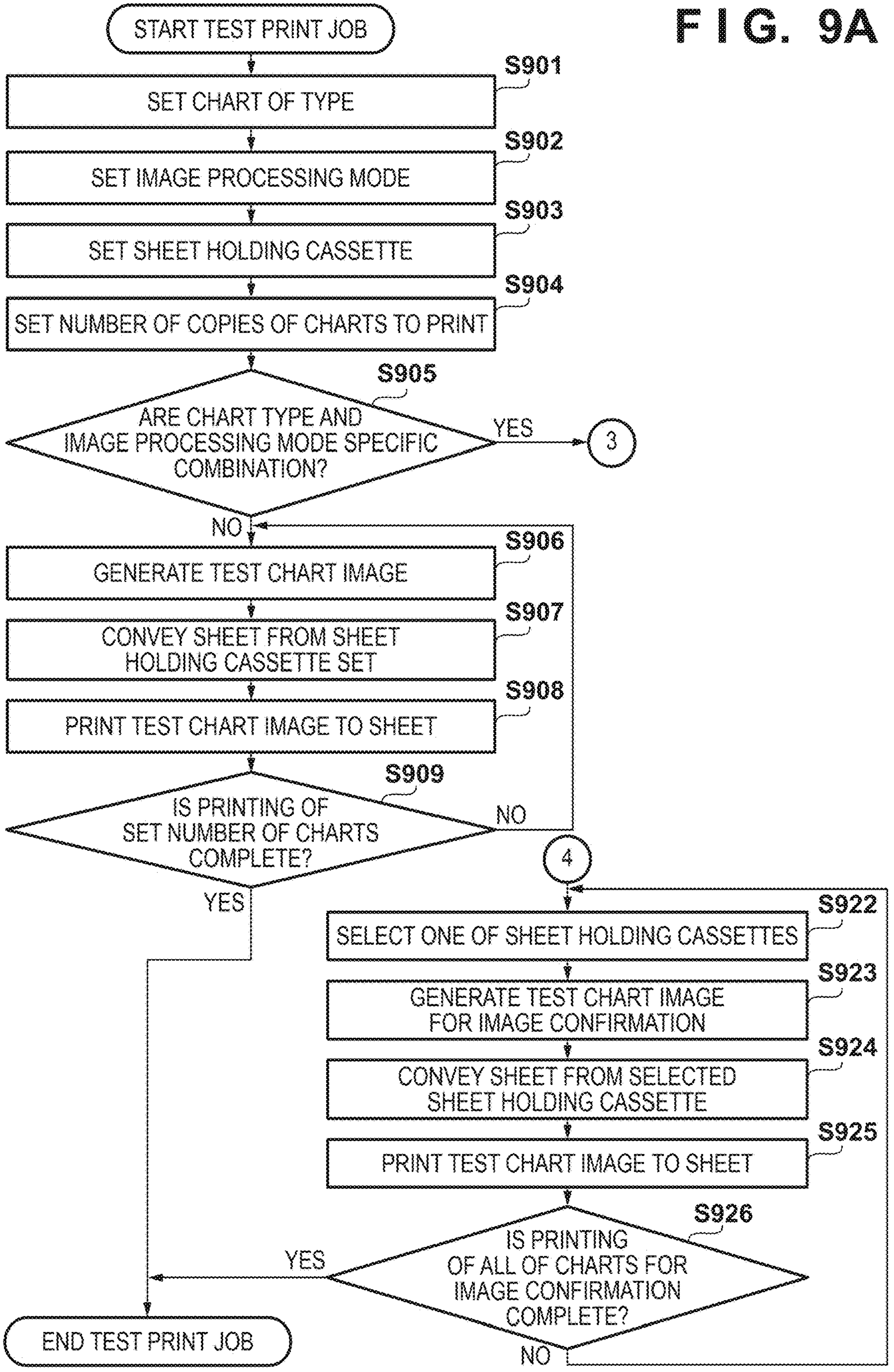
FIGS. 9A and 9B are flowcharts of a test chart print according to an embodiment.
Figure 9B:
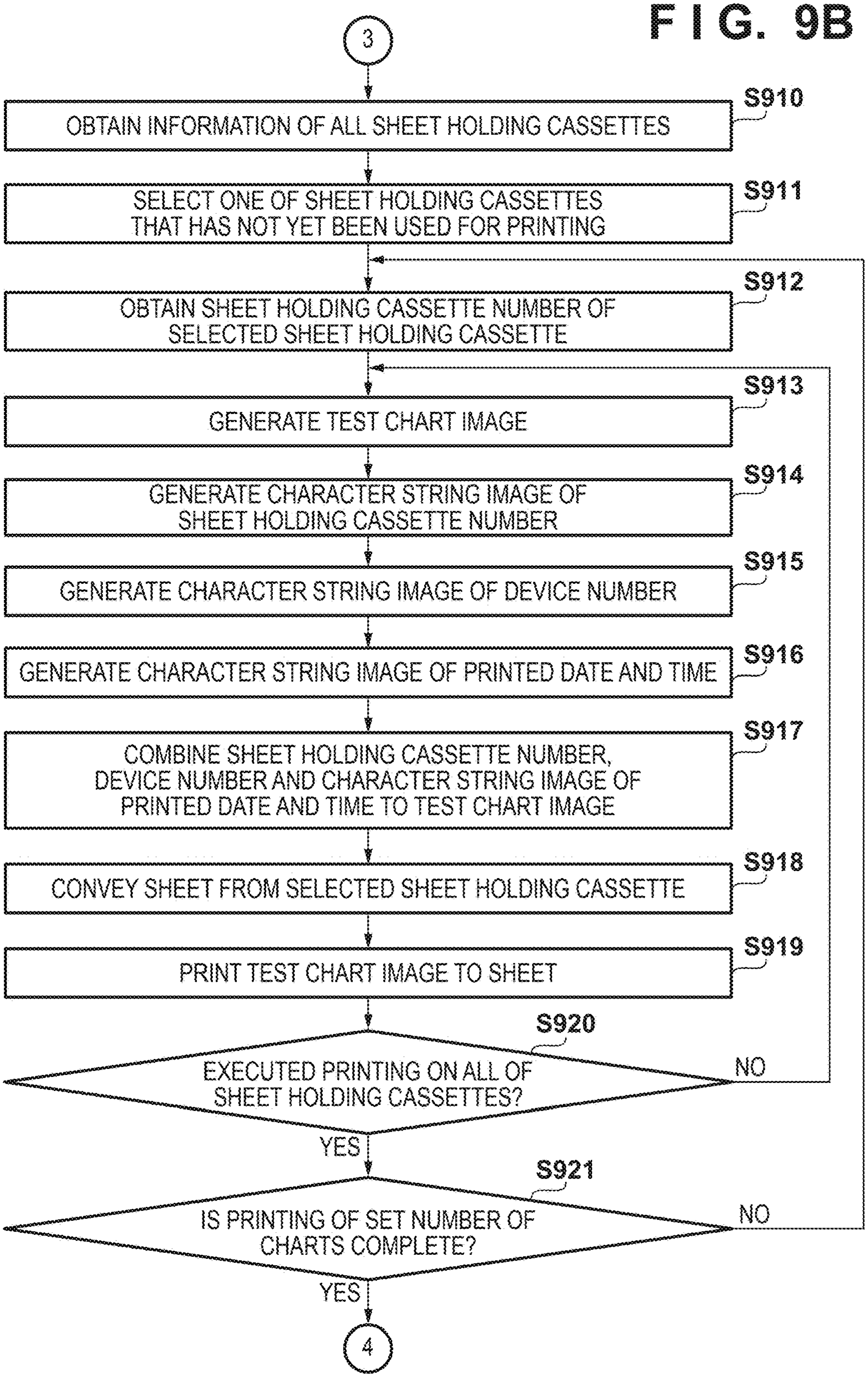

Test chart print processing for printing the test chart images of FIGS. 8A to 8C according to the present embodiment will now be described in accordance with the sequence of FIG. 4 with reference to FIGS. 9A and 9B. The processing described below is implemented by the CPU 111 of the MFP 100 reading out a program stored in the storage unit 114 onto the RAM 112 and executing the program, for example.

In S901 to S904, the CPU 111 displays the test chart print settings screen 501 on the operation unit 150 and receives a test chart print setting from the operator via the operation unit 150. In S901, a setting for the test chart image type described in S303 and S403 is received and the setting value is stored in the RAM 112, and in S902, a setting for the image processing mode described in S304 and S404 is received and the setting value is stored in the RAM 112. Also, in S903, a setting for the sheet holding cassette described in S305 is received and the setting value is stored in the RAM 112, and in S904, a setting for the number of copies of the test chart images described in S307 and S406 is received and the setting value is stored in the RAM 112.

Next, when the operator operates the test print execution button (print start button) 517 via the operation unit 150, the CPU 111 proceeds the processing to S905. In S905, the CPU 111 performs determination for the test chart image type setting and the image processing mode setting received in S901 and S902. Here, the CPU 111 determines whether the setting is designating a consecutive operation of printing the test chart images on sheets conveyed from all of the sheet holding cassettes as described in S403 and S404 and printing a different test chart image on a sheet conveyed from one sheet holding cassette.

In S905, in a case where the setting does not designate consecutive operation (No), the processing proceeds to S906, and the CPU 111 generates a test chart image of the type set in S901. Then, in S906, the CPU 111 executes image processing of the image processing mode set in S902 via the image processing unit 118 and stores the processed image data in the image memory 119.

Then, in S907, the CPU 111 conveys one printing sheet from the sheet holding cassette set in S903. In S908, for the sheet conveyed, the CPU 111 reads out the test chart image data generated in S906 from the image memory 119, transmits the test chart image data to the printer 140, and prints the test chart image on the printing sheet.

In S909, the CPU 111 determines whether or not printing of the number of test chart images set in S904 is complete. In a case where printing of the set number is not complete (No), the processing returns to S906, and the CPU 111 executes the processing from S906 again. In a case where printing of the set number is complete (Yes), the CPU 111 ends the test chart print processing.

On the other hand, in S905, in a case where it is determined that the setting designates consecutive operation (Yes), the processing proceeds to S910, and the CPU 111 obtains the information of all of the sheet holding cassettes installed in the MFP 100. Then, the processing proceeds to S911, and the CPU 111 selects one of the sheet holding cassettes that has not yet been used for test chart image printing. Next, in S912, the sheet holding cassette number for identifying the sheet holding cassette is obtained. Here, the sheet holding cassette number may be a symbol or the like other than a number that indicates information that can identify the sheet holding cassette. Also, the MFP 100 may have a configuration which includes only one sheet holding cassette.

Next, in S913, the CPU 111 generates a test chart image and executes image processing via the image processing unit 118, and the processed test chart image 801 image data is stored in the image memory 119. Here, the generated test chart image is the first type test chart image for confirming the printing operation printed using each sheet holding cassette as described above. For example, it may be the test chart image described using FIGS. 6A, 8A, and 8C. In an example according to the present embodiment, in a case where a consecutive operation is performed of printing the test chart images on the sheets conveyed from all of the sheet holding cassettes and printing the different test chart image on the sheet convey from the one sheet holding cassette, the test chart image type and the image processing mode used are predetermined. However, even in the case of printing the test chart image on the sheets conveyed from all of the sheet holding cassettes, the test chart image type and the image processing mode may be made able to be set, and the test chart image may be generated using the set test chart image type and image processing mode.

Next, in S914, the CPU 111 generates the identification character string (sheet holding cassette number) 802 for printing the sheet holding cassette number obtained in S912 in the test chart image. As described above, the identification character string (sheet holding cassette number) 802 may be only a number or a symbol as long as the sheet holding cassette can be identified.

Next, in S915, the CPU 111 generates the character string image of the device number 803 for printing the device number for identifying the device of the MFP 100 in the test chart image. As described above, as long as the device number 803 can identify the device of the image forming apparatus, a character string indicating information other than the device number may be used.

Next, in S916, the CPU 111 generates the character string image of the printed date and time 804 for printing the date and time that the test chart print was executed in the test chart image. As described above, as long as the printed date and time 804 can identify the date and time that printing was executed, a character string of any format may be used.

Then, in S917, the CPU 111 combines the character string image of the identification character string 802 which is the sheet holding cassette number, the device number 803, and the printed date and time 804 generated in S914 to S916 with the test chart image generated in S913. Then, the CPU 111 stores the composite image data in the image memory 119.

Next, in S918, the CPU 111 conveys one printing sheet from the sheet holding cassette selected in S911. Then, in S919, for the sheet conveyed in S918, the CPU 111 reads out the test chart image data combined in S917 from the image memory 119, transmits the test chart image data to the printer 140, and the printer 140 prints the test chart image on the printing sheet.

Then, in S920, the CPU 111 determines whether or not printing of the test chart images on the sheets conveyed from all of the sheet holding cassettes installed in the MFP 100 is complete. In a case where there are still sheet holding cassettes that have not been used for printing a test chart image (No), the processing returns to S911, and, again, the CPU 111 selects one of the sheet holding cassettes that have not been used for printing a test chart image and executes processing to print the test chart image on a conveyed sheet.

On the other hand, in S920, in a case where printing of the test chart image on the sheets conveyed from all of the sheet holding cassettes is complete (Yes), the processing proceeds to S921, and the CPU 111 determines whether or not printing of the number of copies of the test chart image set in S904 is complete. In a case where printing of the set number is not complete (No), the processing returns to S910, and the CPU 111 executes processing to print the test chart image on the sheets conveyed from all of the sheet holding cassettes again.

In S921, in a case where printing of the set number is complete (Yes), the processing proceeds to S922, and the CPU 111 prints the second type test chart image. In S922, the CPU 111 selects one sheet holding cassette to convey a sheet for a test chart print. The sheet holding cassette may be selected by selecting the first sheet holding cassette via the identification information, such as the number, of the sheet holding cassettes or by a different selection method. Also, a different sheet holding cassette may be selected each time the processing of S922 is executed.

Next, in S923, the CPU 111 generates a test chart image and executes image processing via the image processing unit 118, and the processed image data is stored in the image memory 119. The second type test chart image generated here is a test chart image for confirming the printing operation by the test chart image being printed on a sheet conveyed from any one sheet holding cassette from among the sheet holding cassettes installed in the MFP 100 as described above. For example, it may be one of the test chart images denoted by 604 in FIG. 6B, 610 in FIG. 6C, 616 in FIGS. 6D, and 806 in FIG. 8B. In an example according to the embodiment, the test chart image type and the image processing mode described above are a predetermined type and mode. The test chart image type and the image processing mode may be made able to be set, and the test chart image may be generated using the set test chart image type and image processing mode.

Next, in S924, the CPU 111 conveys one printing sheet from the sheet holding cassette selected in S922. Then, in S925, for the sheet conveyed in S924, the CPU 111 reads out the test chart image data from the image memory 119, transmits the test chart image data to the printer 140, and the printer 140 prints the test chart image on the printing sheet.

In S926, the CPU 111 determines whether or not printing of all of the test chart images for image confirmation to be printed is complete. In a case where there are still test chart images for image confirmation that have not been printed (No), the processing returns to S922, and the CPU 111 again executes processing to print the test chart image from the selection of sheet holding cassettes to be used to convey sheets for test chart image printing.

On the other hand, in S926, in a case where printing of all of the test chart images for image confirmation to be printed is complete (Yes), the CPU 111 ends the test chart print processing.

Accordingly, with one operation, a test chart print of printing the test chart images on the sheets conveyed from all of the sheet holding cassettes and a test chart print of printing a different test chart image on the sheet conveyed from one sheet holding cassette can be consecutively executed.

Note that the present example described above is executed as a test chart print function operated by the person in charge of service, but it is similarly applicable to a function operated by a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-207174, filed Dec. 7, 2023 which is hereby incorporated by reference herein in its entirety.

What is claimed is:

1. An image forming apparatus comprising:

a plurality of sheet holding units each that holds at least one sheet;

a printer that prints an image;

a user interface that receives a print setting for a first type test chart image to be printed on each sheet conveyed from each of the plurality of sheet holding units and for a second type test chart image to be printed on another sheet conveyed from at least one sheet holding unit of the plurality of sheet holding units, the first type test chart image being for confirming a print position of the image printed by the printer, the second type test chart image being for confirming tone of the image printed by the printer, and a controller that controls the printer on a basis of the print setting to convey each sheet from each of the plurality of sheet holding units and print the first type test chart image on the each sheet and following thereafter convey another sheet from the at least one sheet holding unit from among the plurality of sheet holding units and print the second type test chart image on the another sheet.

2. The image forming apparatus according to claim 1, wherein the second type test chart image is a test chart image for confirming color deviation of each color of a plurality of toners for forming a color image.

3. The image forming apparatus according to claim 1, wherein at least one of the first type test chart image and the second type test chart image includes a plurality of test chart images with different confirming perspectives.

4. The image forming apparatus according to claim 1, wherein the controller combines at least one of the first type test chart image and the second type test chart image with information identifying the sheet holding unit for conveying the sheet via the image combining unit.

5. The image forming apparatus according to claim 4, wherein at least one of the first type test chart image and the second type test chart image is further combined with at least one of information identifying an image forming apparatus and a printed date and time.

6. The image forming apparatus according to claim 1, wherein the print setting for the first type test chart image to be printed on sheets conveyed from all of the plurality of sheet holding units and for the second type test chart image to be printed on a sheet conveyed from the at least one sheet holding unit is set via a combination of a specific test chart type and a specific image processing mode.

7. The image forming apparatus according to claim 1, wherein the print setting for the first type test chart image to be printed on sheets conveyed from all of the plurality of sheet holding units and for the second type test chart image to be printed on a sheet conveyed from the at least one sheet holding unit is set via mode designation.

8. The image forming apparatus according to claim 1, wherein the print setting includes a setting for a number of copies of at least one of the first type test chart image and the second type test chart image, and the controller controls the printer to print repeatedly the number of copies of at least one of the first type test chart image and the second type test chart image.

9. A control method for an image forming apparatus comprising a plurality of sheet holding units each configured to hold a sheet and a printer that prints an image, the method comprising:

receiving, via a user interface, a print setting for a first type test chart image to be printed on each sheet conveyed from each of the plurality of sheet holding units and for a second type test chart image to be printed on another sheet conveyed from at least one sheet holding unit, the first type test chart image being for confirming a print position of the image printed by the printer, the second type test chart image being for confirming tone of the image print by the printer; and controlling the printer on a basis of the print setting to convey each sheet from each of the plurality of sheet holding units and print the first type test chart image on the each sheet and following thereafter convey another sheet from the at least one sheet holding unit from among the plurality of sheet holding units and print the second type test chart image on the another sheet.

10. A non-transitory computer-readable storage medium, the storage medium storing a program for causing a computer to execute each step of a method of controlling an image forming apparatus comprising a control unit, a plurality of sheet holding units each configured to hold a sheet, and a printer that prints an image, the method comprising:

receiving, via a user interface, a print setting for a first type test chart image to be printed on each sheet conveyed from each of the plurality of sheet holding units and for a second type test chart image to be printed on another sheet conveyed from at least one sheet holding unit, the first type test chart image being for confirming a print position of the image printed by the printer, the second type test chart image being for confirming tone of the image printed by the printer; and controlling the printer on a basis of the print setting to convey each sheet from each of the plurality of sheet holding units and print the first type test chart image on the each sheet and following thereafter convey another sheet from the at least one sheet holding unit from among the plurality of sheet holding units and print the second type test chart image on the another sheet.

* * * * *